(12) United States Patent
Oga

(10) Patent No.: US 10,285,037 B2
(45) Date of Patent: *May 7, 2019

(54) MOBILE WIRELESS COMMUNICATION SYSTEM

(71) Applicant: NEC Corporation, Minato-ku, Tokyo (JP)

(72) Inventor: Toshiyuki Oga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/918,001

(22) Filed: Mar. 12, 2018

(65) Prior Publication Data

US 2018/0206101 A1    Jul. 19, 2018

Related U.S. Application Data

(63) Continuation of application No. 15/329,643, filed as application No. PCT/JP2015/003677 on Jul. 22, 2015, now Pat. No. 9,955,329.

(30) Foreign Application Priority Data

Jul. 28, 2014    (JP) .................................. 2014-152993

(51) Int. Cl.
*H04W 4/00* (2018.01)
*H04W 4/90* (2018.01)
(Continued)

(52) U.S. Cl.
CPC .............. *H04W 4/90* (2018.02); *H04L 27/26* (2013.01); *H04W 4/10* (2013.01); *H04W 4/18* (2013.01);
(Continued)

(58) Field of Classification Search
CPC ........... H04W 4/90; H04W 4/10; H04W 4/18; H04W 6/50; H04W 6/45; H04W 72/04;
(Continued)

(56) References Cited

U.S. PATENT DOCUMENTS 5,887,263 A *    3/1999    Ishii ..................... H04W 72/082
                                                    455/452.1
6,741,579 B1 *   5/2004    Choi .................... H04B 7/2643
                                                    370/337
(Continued)

FOREIGN PATENT DOCUMENTS

JP    H02-180447 A    7/1990
JP    H06-140968 A    5/1994
(Continued)

OTHER PUBLICATIONS

Real Narrow Band Digital Telecommunication System (SCPC/FDMA) ARIB Standard, ARIB STD-T61, ver. 1.2 first volume, Association of Radio Industries and Businesses, Nov. 30, 2005, Appendix p. 1-1 to Appendix p. 1-29. (Cited in ISR).
(Continued)

*Primary Examiner* — Khai M Nguyen

(57) ABSTRACT

Provided is a mobile wireless communication system that improves response immediacy in a wireless communication system using an SCPC communication system. For this purpose, a base station and/or a plurality of mobile stations is provided with a number-of-channels switching means that monitors the communication state to create determination information for determining the necessity of switching the number of channels, and that switches the ratio of the number of channels for downlink communications and that for uplink communications, in a case where a change in the number of channels is necessary on the basis of the determination information.

20 Claims, 8 Drawing Sheets

(51) Int. Cl.
*H04L 27/26* (2006.01)
*H04W 72/04* (2009.01)
*H04W 76/50* (2018.01)
*H04W 76/45* (2018.01)
*H04W 4/10* (2009.01)
*H04W 4/18* (2009.01)
*H04W 80/10* (2009.01)

(52) U.S. Cl.
CPC ....... *H04W 72/04* (2013.01); *H04W 72/0426* (2013.01); *H04W 76/45* (2018.02); *H04W 76/50* (2018.02); *H04W 80/10* (2013.01)

(58) Field of Classification Search
CPC .... H04W 72/0426; H04W 80/10; H04L 27/26
See application file for complete search history.

(56) References Cited

U.S. PATENT DOCUMENTS

| | | | | |
|---|---|---|---|---|
| 6,859,652 | B2* | 2/2005 | Karabinis | H04B 7/18563 455/427 |
| 7,782,750 | B2* | 8/2010 | Yamaura | H04L 5/0048 370/206 |
| 2002/0055360 | A1* | 5/2002 | Chen | H04W 16/00 455/452.2 |
| 2005/0048985 | A1 | 3/2005 | Haartsen | |
| 2006/0063500 | A1 | 3/2006 | Matoba et al. | |
| 2007/0013486 | A1 | 1/2007 | Yeoh et al. | |
| 2007/0115910 | A1 | 5/2007 | Tanada et al. | |
| 2007/0230376 | A1 | 10/2007 | Park et al. | |
| 2008/0310341 | A1* | 12/2008 | Koyanagi | H04L 5/0007 370/328 |
| 2009/0219909 | A1* | 9/2009 | Ko | H04W 36/06 370/343 |
| 2009/0323608 | A1* | 12/2009 | Adachi | H04W 48/18 370/329 |
| 2011/0134874 | A1* | 6/2011 | Nakao | H04L 5/0094 370/329 |
| 2011/0194525 | A1 | 8/2011 | Nishio et al. | |
| 2012/0263130 | A1* | 10/2012 | Ishikura | H04L 5/001 370/329 |
| 2013/0052342 | A1 | 2/2013 | Stevenson et al. | |

FOREIGN PATENT DOCUMENTS

| | | |
|---|---|---|
| JP | H06-284077 A | 10/1994 |
| JP | H07-107546 A | 4/1995 |
| JP | H07-297829 A | 11/1995 |
| JP | 08274701 A * | 10/1996 |
| JP | H09-200861 A | 7/1997 |
| JP | H11-285059 A | 10/1999 |
| JP | 2002-112326 | 4/2002 |
| JP | 2007-281947 | 10/2007 |
| JP | 2009010529 A * | 1/2009 |
| JP | 2013-135432 A | 7/2013 |
| WO | 2013/042454 A1 | 3/2013 |

OTHER PUBLICATIONS

International Search Report for PCT Application No. PCT/JP2015/003677, dated Sep. 15, 2015.

English translation of Written opinion for PCT Application No. PCT/JP2015/003677.

Extended European Search Report for EP Application No. EP15827518.0 dated Dec. 12, 2017.

* cited by examiner

MOBILE WIRELESS COMMUNICATION SYSTEM

CROSS-REFERENCE TO RELATED APPLICATIONS

The present application is a continuation application of U.S. patent application Ser. No. 15/329,643 filed on Jan. 27, 2017, which is a National Stage Entry of International Application PCT/JP2015/003677, filed on Jul. 22, 2015, which claims the benefit of priority from Japanese Patent Application 2014-152993, filed on Jul. 28, 2014, the disclosures of all of which are incorporated herein, in their entirety, by this reference.

TECHNICAL FIELD

The present invention relates to a mobile wireless communication system.

BACKGROUND ART

In public wireless systems such as fire defense wireless systems, disaster defense wireless systems, and police wireless systems, a Single Channel per Carrier (SCPC) system that allocates one signal channel to one carrier frequency is used in some cases (the following patent documents).

In such public wireless systems, there are a plurality of mobile stations in a region (communication area) covered by one base station. Communication from a base station to a mobile station is referred to as downlink communication, and inversely, communication from the mobile station to the base station is referred to as uplink communication. Signals used respectively are referred to as a downlink signal and an uplink signal.

For the public wireless systems, there are the following characteristics and requests.

(1) An administrative unit such as a local prefectural government, and a municipal government, or a cooperative or an association in which a plurality of these units are combined is operated as one unit.

(2) For each unit of these, there are main operations in which command information and annunciation information is transmitted from the center to terminals of an administrative organization via downlink communication and a site situation is reported to the center from a terminal site via uplink communication. In other words, in downlink communication, one-to-many simultaneous distribution such as broadcasting is mainly performed, and in uplink communication, one-to-one individual communication is mainly performed.

(3) Therefore, when only downlink communication needs to be performed, a reception-dedicated terminal (command receiver) is used. As such a case, a case is cited in which, for example, a fire company organization is a user in a fire defense wireless system.

(4) On the other hand, in uplink communication, it is desirable that not only a base station but also another mobile station can intercept uplink communication from a specific mobile station to share information between the mobile stations.

To realize a public wireless system having these characteristics and requests, allocation of frequency resources is necessary. There is an allocation method based on a hierarchical structure in which, for example, a frequency band is broadly allocated to each administrative function such as fire defense, disaster defense, and police, and further, in the frequency band, a minute frequency band (frequency channel) for each regional organization is allocated.

In this case, to prevent radio wave interference among wireless communication systems of neighboring regions, it is necessary to allocate different frequency channels to respective regional organizations where radio waves are reachable. Therefore, it is desirable to ensure as many frequency channels as possible. However, the frequency resource is limited, and therefore in the SCPC system, an occupied frequency bandwidth of each frequency channel is suppressed in a range where voice signal transmission is possible, and a digital communication system (digital modulation and encoding) has been introduced as a suppression means.

As a specific example, in a digital fire defense wireless system in Japan, a frequency bandwidth of 6.25 kHz is allocated to one frequency channel, and $\pi/4$ shift Quadrature Phase Shift Keying (QPSK) modulation as a digital modulation method, bandwidth compression, and further encoding for information concealment are performed.

Different frequencies are used for downlink communication and uplink communication that configures duplex communication with the downlink communication to become a pair, respectively, but frequency channels of the same band width are basically allocated and the same digital modulation method and encoding method are used.

CITATION LIST

Patent Literature

[PTL 1]
Japanese Laid-open Patent Publication No. H9-2008161
[PTL 2]
Japanese Laid-open Patent Publication No. H6-284077
[PTL 3]
Japanese Laid-open Patent Publication No. H6-140968
[PTL 4]
Japanese Laid-open Patent Publication No. 2013-135432
[PTL 5]
Japanese Laid-open Patent Publication No. 2007-281947
[PTL 6]
International Publication No. WO2013/042454

SUMMARY OF INVENTION

Technical Problem

However, in the above-described public wireless systems, there have been cases in which emergency responses (immediate responses) are difficult.

When a mobile station responds, in uplink communication, to information transmitted from a base station in downlink communication, there may be a plurality of mobile stations that desire uplink communication transmission to the base station having transmitted the downlink communication. However, since numbers of downlink/uplink frequency channels simultaneously usable at a certain time are the same, it is necessary for a mobile station that desires uplink communication transmission to confirm that a channel for uplink communication is not being used by another mobile station and, upon being used, to wait until the channel becomes unused.

In other words, when a mobile station responds to information transmitted from a base station, it is necessary for another mobile station to perform no communication (a channel is unused). Response immediacy is impaired by a time until the channel becomes unused.

Therefore, a first object of the present invention is to provide a mobile wireless communication system in which response immediacy is improved.

Further, in the above-described public wireless systems, there has been a problem that a power consumption of a mobile station increases.

To uplink communication transmitted from a mobile station, a frequency channel of the same band width as for downlink communication transmitted from a base station is allocated, and the same digital modulation method and encoding method as for the downlink communication are used. Further, in both the base station and the mobile station, downlink communication and uplink communication frequently share an antenna, and therefore there is not a large difference between downlink communication and uplink communication in antenna gain and radio wave propagation. Therefore, to achieve, in uplink communication, the same communication quality as in downlink communication, it is necessary for the mobile station to transmit, via uplink communication, the equivalent power as a wireless power transmitted by the base station via downlink communication. As a result, a power consumption of the mobile station increases, and heat generation associated with the power consumption also increases.

On the other hand, although the mobile station needs to endure a high temperature environment, compared with the base station, a reduced size is needed to ensure portability and therefore heat releasing performance is constrained. Further, in a disaster occurrence situation, it is difficult to ensure a power supply, and therefore it is necessary to be able to reduce power consumption, compared with that in a normal situation and perform drive using a battery for a long period.

Therefore, a second object of the present invention is to provide a mobile wireless communication system including a mobile station in which power consumption and heat generation associated with the power consumption are small.

Further, in the above-described public wireless systems, there has been a problem that when a mechanism for encoding and decoding fails, there has been a high possibility that it is difficult for an operator to communicate.

Encoding and decoding used in a public wireless system prioritize bandwidth compression performance and concealment performance, and therefore are based on processing in which it is assumed that advanced encoding and decoding processing, i.e. high-speed operation using an electronic circuit can be used.

In transmission of information, a button operation and utterance information of an operator is encoded and transmitted by a device configuring the present system. In reception of information, the information encoded at the time of transmission is converted, by a device configuring the present system, to a physical event recognizable by the operator through the five senses so that the operator can recognize the information. However, in a situation where these public wireless systems are specifically needed in a disaster occurrence situation and the like, due to breakage resulting from a mechanical cause such as vibrations or an impact, or breakage or data errors resulting from an electromagnetic cause produced by lightning or electric sparks, the mechanism for encoding or conversion fails, and then it becomes difficult to perform transmission and reception in some cases.

However, even when a failure is occurring in such conversion, it may be possible to emit and stop wireless radio waves of an own station or to discriminate an emission and a stop of wireless radio waves by another base station or mobile station.

Therefore, a third object of the present invention is to provide a mobile wireless communication system including an alternative encoding/decoding means capable of continuing communication by an operator even when a failure is occurring in the mechanism for encoding or decoding.

Solution to Problem

To solve the problems, a mobile communication system including a base station and a plurality of mobile stations that communicate with the base station is characterized in that at least one of the base station or the plurality of mobile stations includes a number-of-channels switching means that monitors a communication state and creates determination information for determining a necessity of switching a number of channels, and that switches, when it is necessary to change the number of channels on the basis of the determination information, a ratio of numbers of channels for downlink communication and uplink communications.

Further, to solve the problems, a mobile communication system including a base station and a plurality of mobile stations that communicate with the base station includes a transmission power control means configured to switch a ratio of numbers of channels for downlink communication and uplink communication and control, in accordance with a change of a transmission bandwidth produced as the result of the switching, transmission power.

Further, to solve the problems, a mobile communication system including a base station and a plurality of mobile stations that communicate with the base station includes an encoding method switching means and a modulation method switching means configured to switch an encoding method and a modulation method corresponding to the encoding method in cooperation with a switch of a ratio of numbers of channels for downlink communication and uplink communication.

Advantageous Effects of Invention

According to the present invention, a time until a channel becomes unused can be shortened, and therefore response immediacy is improved.

Further, according to the present invention, transmission power can be controlled in accordance with a change of a transmission band, and therefore power consumption and heat generation associated therewith are reduced.

Further, according to the present invention, an alternative encoding/decoding means is included, and therefore communication can be continued even when a mechanism for encoding or decoding fails.

DESCRIPTION OF EMBODIMENTS

First Exemplary Embodiment

Figure 1:
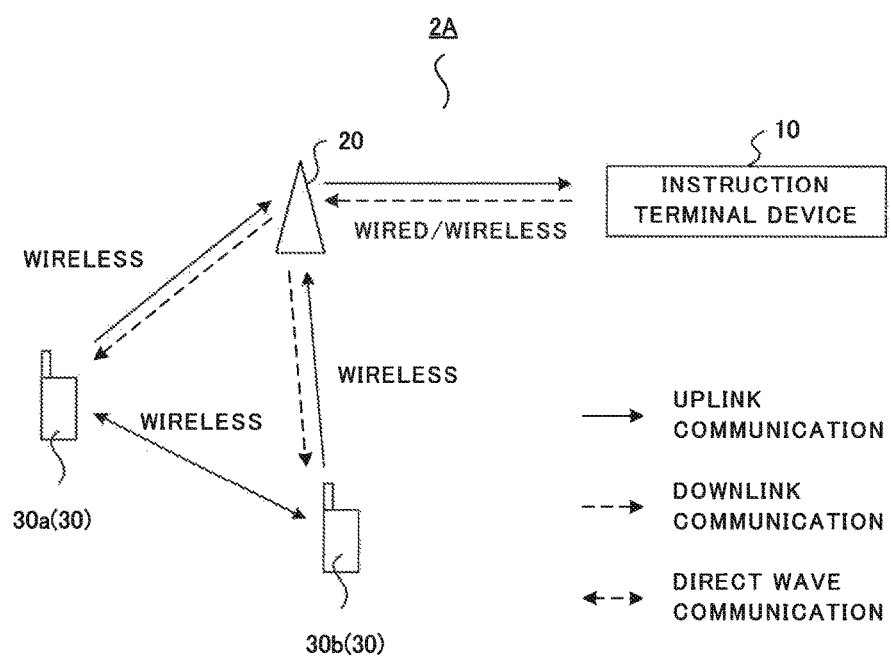
FIG. 1 is a block diagram of a mobile wireless communication system according to the present exemplary embodiment.

Exemplary embodiments of the present invention will be described. FIG. 1 is a block diagram of a mobile wireless communication system 2A according to the present exemplary embodiment. The mobile wireless communication system 2A includes an instruction terminal device 10, a base station 20, and mobile stations 30 (30a, 30b). In FIG. 1, two mobile stations 30 are illustrated, but there may be three or more mobile stations 30.

Outlined communication steps in the mobile wireless communication system 2A are as follows. First, the mobile station 30 generates an uplink signal and transmits the generated uplink signal via wireless communication. The base station 20 and another mobile station 30 receive the transmitted uplink signal. In the following description, a communication pattern in which an uplink signal from the mobile station 30 is received by another mobile station 30 will be expressed as a direct wave communication.

The base station 20 transmits the uplink signal received from the mobile station 30 to the instruction terminal device 10 via wired or wireless communication. The instruction terminal device 10 receives the uplink signal from the base station 20.

On the other hand, the instruction terminal device 10 generates a downlink signal and transmits the generated downlink signal to the base station 20 via wired or wireless communication, and the base station 20 receives the transmitted signal. The base station 20 transmits the downlink signal received from the instruction terminal device 10 to each mobile station 30 via wireless communication. Each mobile station 30 receives the downlink signal from the base station 20.

(1) Mobile Station 30

Figure 2:
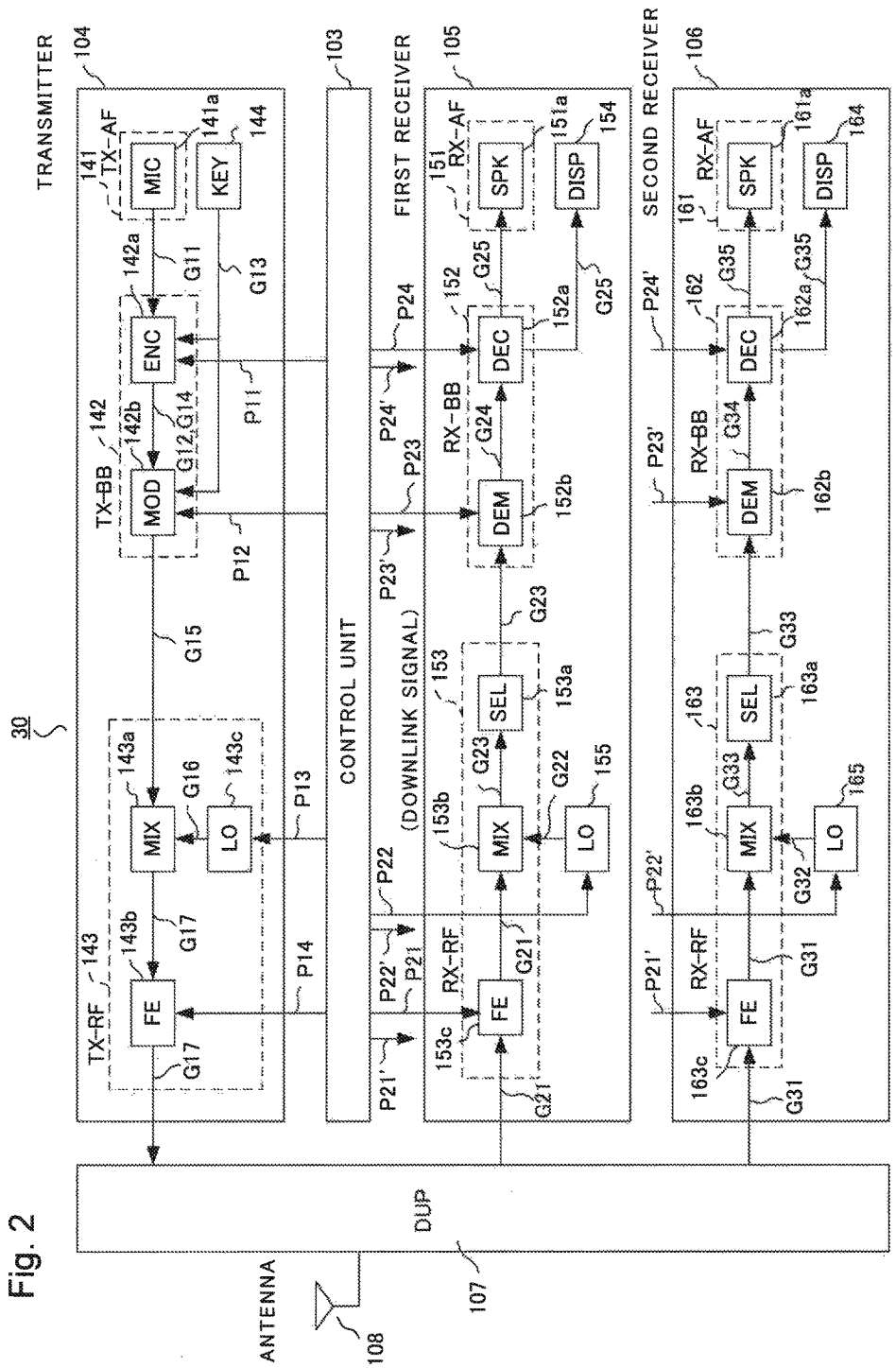
FIG. 2 is a block diagram of a mobile station.

Next, the mobile station 30 in the mobile wireless communication system 2A that performs such communication will be described. FIG. 2 is a block diagram of the mobile station 30.

The mobile station 30 includes a control unit 103, a transmitter 104, a first receiver 105 for downlink signal reception, a second receiver 106 for uplink signal interception, a duplexer 107, and an antenna 108.

(1-A) Configuration of Transmitter

The transmitter 104 includes a voice signal processing unit (TX-AF) 141, a baseband (BB) signal processing unit (TX-BB) 142, a high-frequency signal processing unit (TX-RF) 143, and an input unit (KEY) 144 for a narrowband frequency channel, and transmits an uplink signal to the base station 20.

The voice signal processing unit 141 includes a voice input unit (MIC) 141a.

Further, the BB signal processing unit (TX-BB) 142 includes an encoding unit (ENC) 142a and a modulator (MOD) 142b.

Further, the high-frequency signal processing unit (TX-RF) 143 includes a frequency converter (MIX) 143a, a high-frequency front end (FE) unit (FE) 143b, and an oscillator (LO) 143c.

A voice signal that is an analog signal input from the voice input unit 141a such as a microphone and the like is converted to a transmission digital voice signal G11 by the voice input unit 141a and is input to the encoding unit 142a of the BB signal processing unit 142.

The encoding unit 142a encodes the transmission digital voice signal G11 on the basis of an encoding method specifying signal P11 from the control unit 103 and outputs the encoded signal to the modulator 142b as an encode voice signal G12.

The encoding method specifying signal P11 is information for specifying a component (hardware (HW)) and an algorithm (software (SW)) used for encoding processing and is generated by the control unit 103 on the basis of registration information previously recorded on the control unit 103, request information transmitted from a communication partner, determination information determined in accordance with a type of data transmitted as a transmission signal, determination information determined on the basis of quality (error rate, data rate, latency) necessary for a transmission signal, and determination information determined on the basis of monitoring information (electric field intensity, error rate) of a reception signal.

On the other hand, a transmission digital data signal G13 from the input unit 144 is input to the encoding unit 142a and the modulator 142b. The input unit 144 can include a plurality of keys such as a keyboard of a general QWERTY layout or a numeric keypad, a touch sensor or a touch panel, a proximity sensor, and a camera system that discriminates gestures of an operator.

The encoding unit 142a encodes the transmission digital data signal G13 and outputs the encoded signal to the modulator 142b as an encode data signal G14.

The modulator 142b converts at least one of the encode voice signal G12 or the encode data signal G14 to a transmission analog BB signal (transmission ABB signal) or a transmission intermediate-frequency signal (transmission IF signal) that is an analog signal on the basis of a modulation method specifying signal P12. The modulator 142b outputs the converted signal to the frequency converter 143a of the high-frequency signal processing unit 143 as a modulation signal G15.

As a generation method for the modulation signal G15, a method for inputting an input digital signal to an analog filtering unit and waveform-shaping the input signal to a necessary analog signal waveform, a method for simplifying an analog filtering unit for analog waveform shaping by temporarily generating a digital sampling waveform corresponding to an analog signal waveform to be needed via digital operation, followed by D/A conversion, and a method for generating an analog waveform of an intermediate-frequency band via analog or digital operation is applicable.

The modulation method specifying signal P12 is information for specifying a component (HW) and an algorithm (SW) used for modulation processing. The control unit 103 generates the modulation method specifying signal P12 by on the basis of registration information previously recorded on the control unit 103, request information transmitted from a communication partner, determination information determined in accordance with a type of data transmitted as a transmission signal, determination information determined on the basis of quality (error rate, data rate, latency) necessary for data transmitted as a transmission signal, and determination information determined on the basis of monitoring information (electric field intensity, error rate) of a reception signal.

When a component (HW) or an algorithm (SW) used for modulation processing is specified by the modulation method specifying signal P12, it is possible to select modulation processing appropriate for a communication partner, modulation processing optimum for a type of data transmitted as a transmission signal and quality to be needed, and modulation processing suitable for a radio wave propagation situation estimated from monitoring information of a reception signal and improve power efficiency and communication quality.

The modulation signal G15 from the modulator 142b and a transmission local oscillation signal (transmission LO signal) G16 from the oscillator 143c are input to the frequency converter 143a. The transmission LO signal G16 is a signal for determining a carrier frequency as a wireless signal. The frequency converter 143a mixes the modulation signal G15 and the transmission LO signal G16 and outputs the resulting signal to the high-frequency FE unit 143b as a transmission RF signal (transmission high-frequency signal) G17.

A frequency setting signal P13 is information that is input to the oscillator 143c and specifies a frequency of the transmission LO signal G16. The control unit 103 generates the frequency setting signal P13 on the basis of transmission frequency information input by an operation of an operator or transmission frequency information associated with reception frequency information determined by search processing when there is a reception signal search function.

Further, mixing processing executed by the frequency converter 143a is processing for performing frequency conversion of the modulation signal G15 and the transmission LO signal G16 by analog mixing processing and generating the transmission RF signal G17.

The high-frequency FE unit 143b performs power amplification and gain adjustment power-supply-controlled for power saving (elimination of undesired waves from the transmission RF signal G17 and amplification up to a power necessary for transmission) for the transmission RF signal G17 on the basis of a power supply/gain control signal P14 generated by the control unit 103 and outputs the resulting signal to the duplexer 107.

The duplexer 107 outputs the transmission RF signal G17 to the antenna 108. The antenna 108 transmits the input transmission RF signal G17 to the base station 20 and another mobile station 30 as an uplink signal radio wave.

At least one of the modulator 142b or the oscillator 143c can receive transmission narrowband frequency channel specifying information (TX_NB_FCH specifying information) from the control unit 103. At least one of the modulator 142b or the oscillator 143c includes a function for outputting, when the transmission narrowband frequency channel specifying information has been input, a modulation signal or an oscillation signal having a frequency based on contents of the information.

(1-B) Configuration of First Receiver

The first receiver 105 includes a first voice signal processing unit (RX-AF) 151, a first baseband (BB) signal processing unit (RX-BB) 152, a first high-frequency signal processing unit (RX-RF) 153, a first display (DISP) 154, and a first oscillator (LO) 155, and receives a downlink signal from the base station 20.

The first voice signal processing unit (RX-AF) 151 includes a first voice output unit (SPK) 151a.

Further, the first BB signal processing unit (RX-BB) 152 includes a first decoder (DEC) 152a and a first demodulator (DEM) 152b.

The first high-frequency signal processing unit (RX-RF) 153 includes a first channel selection unit (SEL) 153a, a first frequency converter (MIX) 153b, and a first high-frequency front end (FE) unit (FE) 153c.

A DL reception RF signal (base station wave reception high-frequency signal) G21 from the base station 20, the signal being acquired in the antenna 108, is input to the first high-frequency FE unit 153c of the first high-frequency signal processing unit 153 via the duplexer 107.

The first high-frequency FE unit 153c performs power amplification and gain adjustment power-supply-controlled for power saving for the DL reception RF signal G21 on the basis of a power supply/gain control signal P21 generated by the control unit 103 and inputs the resulting signal to the first frequency converter 153b.

The DL reception RF signal G21 and a DL reception LO signal (base station wave reception local oscillation signal) G22 from the first oscillator 155 are input to the first frequency converter 153b. The first frequency converter 153b performs frequency conversion for the DL reception RF signal G21 by the DL reception LO signal G22, generates a DL reception ABB signal (base station wave reception analog baseband signal) or a DL reception IF signal (base station wave reception intermediate-frequency signal) that is an analog signal. The first frequency converter 153b outputs the generated signal to the first channel selection unit 153a as a frequency conversion signal G23.

At that time the first oscillator 155 generates the DL reception LO signal G22 on the basis of a frequency setting signal P22. The frequency setting signal P22 is information for specifying a frequency of a reception local oscillation signal and is generated by the control unit 103 on the basis of reception frequency information input by an operation of an operator or reception frequency information determined by search processing when there is a reception signal search function.

Figure 3:
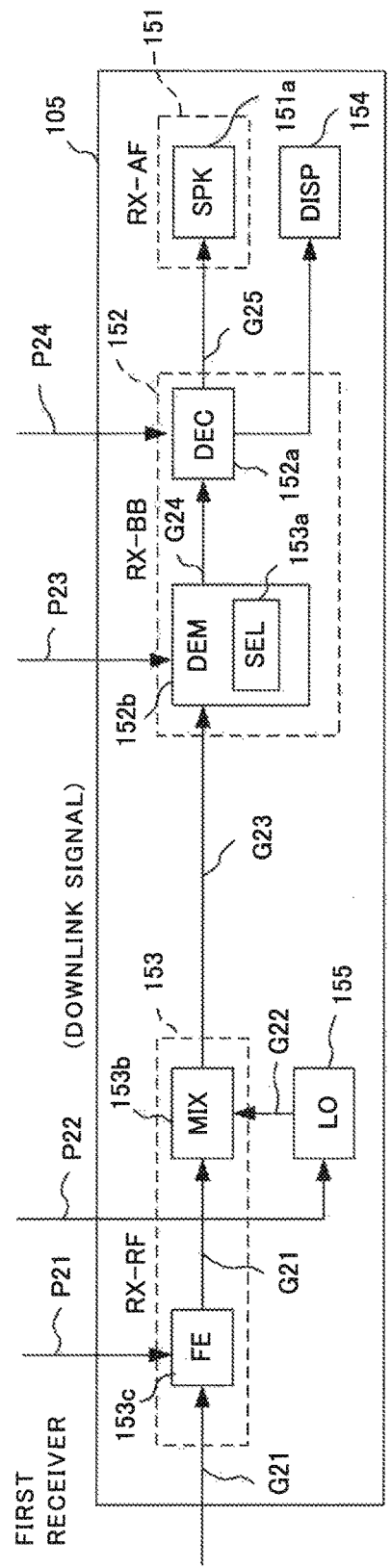
FIG. 3 is a block diagram of a receiver in which a channel selection unit is included in a first demodulator.

The first channel selection unit 153a can receive base station wave reception narrowband frequency channel specifying information (DL_RX NB_FCH specifying information) from the control unit 103. The first channel selection unit 153a includes a function for extracting components of a frequency and a band based on contents of the base station wave reception narrowband frequency channel specifying information in the frequency conversion signal G23 when the base station wave reception narrowband frequency channel specifying information has been input. The first channel selection unit 153a can be also included in at least one of the first demodulator 152b or the first oscillator 155. FIG. 3 is a block diagram of a receiver in which the first channel selection unit 153a in FIG. 2 is included in the first demodulator 152b. In FIG. 3, as a part of the function of the first demodulator 152b, an extraction function is included. When the first channel selection unit 153a is included in the first oscillator 155 in FIG. 2, an extraction function is realized by frequency selection.

In FIG. 2 again, the first demodulator 152b converts the frequency conversion signal G23 to at least one of an encoded base station wave reception digital voice signal or an encoded base station wave reception digital data signal on the basis of a demodulation method specifying signal P23 and outputs the resulting signal to the first demodulator 152a as a demodulation signal G24.

The demodulation method specifying signal P23 is information for specifying a component (HW) and an algorithm (SW) used for demodulation processing. The control unit 103 generates the demodulation method specifying signal P23 on the basis of registration information previously recorded on the control unit 103, request information transmitted from a communication partner, and determination information determined by the control unit 103 on the basis of monitoring information (electric field intensity, error rate) of a reception signal.

When a component (HW) or an algorithm (SW) used for demodulation processing is specified by the demodulation method specifying signal P23, it is possible to select demodulation processing appropriate for a communication partner, demodulation processing optimum for a type of data to be obtained as a reception signal and quality to be needed for a reception signal, and demodulation processing suitable for a radio wave propagation situation estimated from monitoring information of a reception signal and improve communication quality.

The first decoder 152*a* decodes a demodulation signal G24 on the basis of a decoding method specifying signal P24 and outputs the decoded signal to the first voice output unit 151*a* of the first voice signal processing unit 151 and the first display 154 as a decode signal G25.

The decode signal G25 output to the first voice output unit 151*a* is a signal corresponding to the base station wave reception digital voice signal. Further, the decode signal G25 output to the first display 154 is a signal corresponding to the encoded base station wave reception digital data signal.

The decoding method specifying signal P24 is information for specifying a component (HW) and an algorithm (SW) used for decoding processing. The control unit 103 generates the decoding method specifying signal P24 on the basis of registration information previously recorded on the control unit 103, request information transmitted from a communication partner, and determination information determined by the control unit 103 on the basis of monitoring information (electric field intensity, error rate) of a reception signal.

When a component (HW) or an algorithm (SW) used for decoding processing is specified by the decoding method specifying signal P24, it is possible to select decoding processing appropriate for a communication partner, decoding processing optimum for a type of data to be obtained as a reception signal and quality to be needed for a reception signal, and decoding processing suitable for a radio wave propagation situation estimated from monitoring information of a reception signal and improve communication quality.

The first voice output unit 151*a* converts the input decode signal G25 corresponding to the base station wave reception digital voice signal to a voice and outputs the voice. Further, the first display 154 converts the input decode signal G25 corresponding to the base station wave reception digital data signal to base station wave narrowband frequency channel information and outputs the information.

(1-C) Configuration of Second Receiver

The second receiver 106 includes a second voice signal processing unit (RX-AF) 161, a second baseband (BB) signal processing unit (RX-BB) 162, a second high-frequency signal processing unit (RX-RF) 163, a second display (DISP) 164, and a second oscillator (LO) 165, and receives a direct wave signal from another mobile station 30.

The second voice signal processing unit (RX-AF) 161 includes a second voice output unit (SPK) 161*a*.

Further, the second BB signal processing unit (RX-BB) 162 includes a second decoder (DEC) 162*a* and a second demodulator (DEM) 162*b*.

The second high-frequency signal processing unit (RX-RF) 163 includes a second channel selection unit (SEL) 163*a*, a second frequency converter (MIX) 163*b*, and a second high-frequency front end (FE) unit (FE) 163*c*.

A UL reception RF signal (direct wave reception high-frequency signal) G31 from another mobile station 30, the signal being acquired in the antenna 108, is input to the second high-frequency FE unit 163*c* of the second high-frequency signal processing unit 163 via the duplexer 107. The second high-frequency FE unit 163*c* performs power amplification and gain adjustment power-supply-controlled for power saving for the UL reception RF signal G31 on the basis of a power supply/gain control signal P21' generated by the control unit 103 and outputs the resulting signal to the second frequency converter 163*b*.

The UL reception RF signal G31 and a UL reception LO signal (direct wave reception local oscillation signal) G32 from the second oscillator 165 are input to the second frequency converter 163*b*. The second frequency converter 163*b* performs frequency conversion for the UL reception RF signal G31 by the UL reception LO signal G32, generates a UL reception ABB signal (direct wave reception analog baseband signal) or a UL reception IF signal (direct wave reception intermediate-frequency signal) that is an analog signal. The second frequency converter 163*b* outputs the generated signal to the second channel selection unit 163*a* as a frequency conversion signal G33.

At that time, the second oscillator 165 generates the UL reception LO signal G32 on the basis of a frequency setting signal P22'. The frequency setting signal P22' is information for specifying a frequency of a reception local oscillation signal and is generated by the control unit 103 on the basis of reception frequency information input by an operation of an operator or reception frequency information determined by search processing when there is a reception signal search function.

The second channel selection unit 163*a* can receive direct wave reception narrowband frequency channel specifying information (UL_RX NB_FCH specifying information) from the control unit 103. The second channel selection unit 163*a* includes a function for extracting components of a frequency and a band based on contents of the direct wave reception narrowband frequency channel specifying information in the frequency conversion signal G33 when the direct wave reception narrowband frequency channel specifying information has been input. The second channel selection unit 163*a* can be also included in at least one of the second demodulator 162*b* or the second oscillator 165. When the second channel selection unit 163*a* is included in the second demodulator 162*b*, an extraction function is included as a part of the function of the second demodulator 162*b*. When the second channel selection unit 163*a* is included in the second oscillator 165, an extraction function is realized by frequency selection.

The second demodulator 162*b* converts the frequency conversion signal G33 to at least one of an encoded direct wave reception digital voice signal or an encoded direct wave reception digital data signal on the basis of a demodulation method specifying signal P23' and outputs the resulting signal to the second demodulator 162*a* as a demodulation signal G34.

The demodulation method specifying signal P23' is information for specifying a component (HW) and an algorithm (SW) used for demodulation processing. The control unit 103 generates the demodulation method specifying signal P23' on the basis of registration information previously recorded on the control unit 103, request information transmitted from a communication partner, and determination information determined by the control unit 103 on the basis of monitoring information (electric field intensity, error rate) of a reception signal.

When a component (HW) or an algorithm (SW) used for demodulation processing is specified by the demodulation method specifying signal P23', it is possible to select demodulation processing appropriate for a communication partner, demodulation processing optimum for a type of data to be obtained as a reception signal and quality to be needed for a reception signal, and demodulation processing suitable for a radio wave propagation situation estimated from monitoring information of a reception signal and improve communication quality.

The second decoder 162*a* decodes the demodulation signal G34 on the basis of a decoding method specifying signal P24' and outputs the decoded signal to the second voice output unit 161*a* of the second voice signal processing unit 161 and the second display 164 as a decode signal G35.

The decode signal G35 output to the second voice output unit 161*a* is a signal corresponding to the direct wave reception digital voice signal. Further, the decode signal G35 output to the second display 164 is a signal corresponding to the encoded direct wave reception digital data signal.

The decoding method specifying signal P24' is information for specifying a component (HW) and an algorithm (SW) used for decoding processing. The control unit 103 generates the decoding method specifying signal P24' on the basis of registration information previously recorded on the control unit 103, request information transmitted from a communication partner, and determination information determined by the control unit 103 on the basis of monitoring information (electric field intensity, error rate) of a reception signal.

When a component (HW) or an algorithm (SW) used for decoding processing is specified by the decoding method specifying signal P24', it is possible to select decoding processing appropriate for a communication partner, decoding processing optimum for a type of data to be obtained as a reception signal and quality to be needed for a reception signal, and decoding processing suitable for a radio wave propagation situation estimated from monitoring information of a reception signal and improve communication quality.

The second voice output unit 161*a* converts the input decode signal G35 corresponding to the direct wave reception digital voice signal to a voice and outputs the voice. Further, the second display 164 converts the input decode signal G35 corresponding to the direct wave reception digital data signal to direct wave narrowband frequency channel information and outputs the information.

(2) Base Station

Figure 4:
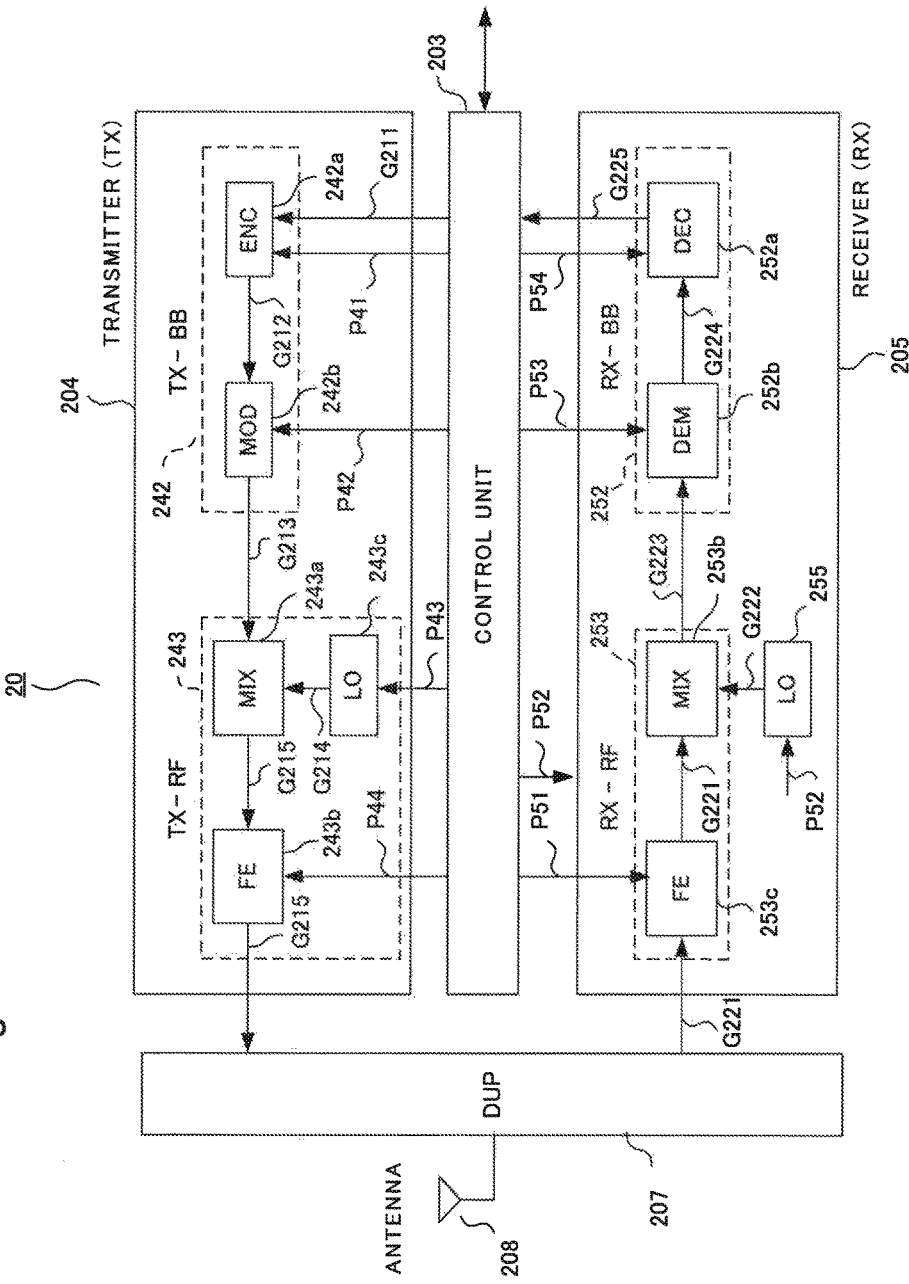
FIG. 4 is a block diagram of a base station.

Next, the base station 20 will be described. FIG. 4 is a block diagram of the base station 20.

The base station 20 of the present invention includes a control unit 203, a transmitter (TX) 204, a receiver (RX) 205 for uplink signal reception, a duplexer 207, and an antenna 208.

(2-1) Function of Transmitter

The transmitter (TX) 204 includes a baseband (BB) signal processing unit (TX-BB) 242 and a high-frequency signal processing unit (TX-RF) 243 and transmits a downlink signal.

The BB signal processing unit (TX-BB) 242 includes an encoding unit (ENC) 242*a* and a modulator (MOD) 242*b*. Further, the high-frequency signal processing unit (TX-RF) 243 includes a frequency converter (MIX) 243*a*, a high-frequency front end (FE) unit (FE) 243*b*, and an oscillator (LO) 243*c*.

The control unit 203 inputs an input signal G211 of at least one of a transmission digital voice signal or a transmission digital data signal input from an external network to the encoding unit 242*a* of the BB signal processing unit 242.

As the external network, a local area network (LAN) or a public communication network is cited, and as a transmission source of transmission information (a transmission digital voice signal and a transmission digital data signal), the instruction terminal device 10 and a line control device is cited.

The encoding unit 242*a* encodes the input signal G211 of at least one of a transmission digital voice signal or a transmission digital data signal on the basis of an encoding method specifying signal P41. The encoding unit 242*a* outputs the encoded transmission digital voice signal and the encoded transmission digital data signal to the modulator 242*b* as an encode signal G212 for each signal.

The encoding method specifying signal P41 is information for specifying a component (hardware (HW) and an algorithm (software (SW) used for encoding processing. The control unit 203 generates the encoding method specifying signal P41 on the basis of registration information previously recorded on the control unit 203, request information transmitted from a communication partner, determination information determined in accordance with a type of data transmitted as a transmission signal, determination information determined on the basis of quality (error rate, data rate, latency) necessary for a transmission signal, and determination information determined on the basis of monitoring information (electric field intensity, error rate) of a reception signal.

The modulator 242*b* converts the encode signal G212 to a transmission analog BB signal (transmission ABB signal) or a transmission intermediate-frequency signal (transmission IF signal) that is an analog signal on the basis of a modulation method specifying signal P42. The modulator 242*b* outputs the converted signal to the frequency converter 243*a* of the high-frequency signal processing unit 243 as a modulation signal G213.

As a generation method for the modulation signal G213, a method for inputting an input digital signal to an analog filtering unit and waveform-shaping the input signal to a necessary analog signal waveform, a method for simplifying an analog filtering unit for analog waveform shaping by temporarily generating a digital sampling waveform corresponding to an analog signal waveform to be needed via digital operation, followed by D/A conversion, and a method for generating an analog waveform of an intermediate-frequency band via analog or digital operation is applicable.

The modulation method specifying signal P42 is information for specifying a component (HW) and an algorithm (SW) used for modulation processing. The control unit 203 generates the modulation method specifying signal P42 on the basis of registration information previously recorded on the control unit 203, request information transmitted from a communication partner, determination information determined on the basis of a type of data transmitted as a transmission signal, determination information determined on the basis of quality (error rate, data rate, latency) necessary for data transmitted as a transmission signal, and determination information determined on the basis of monitoring information (electric field intensity, error rate) of a reception signal.

The modulation signal G213 from the modulator 242b and a transmission local oscillation signal (transmission LO signal) G214 from the oscillator 243c are input to the frequency converter 243a. The transmission LO signal G214 is a signal for determining a carrier frequency as a wireless signal. The frequency converter 243a mixes the modulation signal G213 and the transmission LO signal G214 and outputs the resulting signal to the high-frequency FE unit 243b as a transmission RF signal (transmission high-frequency signal) G215.

A frequency setting signal P43 is information that is input to the oscillator 243c and specifies a frequency of the transmission LO signal G214. The control unit 203 generates the frequency setting signal P43 on the basis of transmission frequency information previously allocated to the base station 20 to determine a transmission frequency.

Further, mixing processing executed by the frequency converter 243a is processing for performing frequency conversion of the modulation signal G213 and the transmission LO signal G214 via analog mixing operation and generating the transmission RF signal G215.

The high-frequency FE unit 243b performs power amplification and gain adjustment power-supply-controlled for power saving (elimination of undesired waves from the transmission RF signal G215 and amplification up to a power necessary for transmission) for the transmission RF signal G215 on the basis of a power supply/gain control signal P44 generated by the control unit 203 and outputs the resulting signal to the duplexer 207.

The duplexer 207 outputs the transmission RF signal G215 to the antenna 208. The antenna 208 radiates the input transmission RF signal G215 toward the mobile station 30 as a downlink signal radio wave.

(2-2) Configuration of Receiver

The receiver 205 includes a baseband (BB) signal processing unit (RX-BB) 252, a high-frequency signal processing unit (RX-RF) 253, and an oscillator (LO) 255, and receives an uplink signal from the mobile station 30.

The BB signal processing unit (RX-BB) 252 includes a decoder (DEC) 252a and a demodulator (DEM) 252b.

Further, the high-frequency signal processing unit (RX-RF) 253 includes a frequency converter (MIX) 253b and a high-frequency front end (FE) unit (FE) 253c.

A reception RF signal (reception high-frequency signal) G221 from the mobile station 30, the signal being acquired in the antenna 208, is input to the high-frequency FE unit 253c of the high-frequency signal processing unit (RX_RF) 253 through the duplexer 207.

The reception high-frequency FE unit 253c performs power amplification and gain adjustment power-supply-controlled for power saving for the reception RF signal G221 on the basis of a power supply/gain control signal P51 generated by the control unit 203 and inputs the resulting signal to the frequency converter 253b.

The reception RF signal G221 and a reception local oscillation signal (reception LO signal) G222 from the oscillator (LO) 255 are input to the frequency converter 253b. The frequency converter 253b performs frequency conversion for the reception RF signal G221 by the reception LO signal G222, generates a reception analog BB signal (reception ABB signal) or a reception intermediate-frequency signal (reception IF signal) that is an analog signal, and outputs the generated signal to the demodulator 252b as a frequency conversion signal G223.

The oscillator 255 generates the reception LO signal G222 on the basis of a frequency setting signal P52 from the control unit 203 and outputs the generated signal. The frequency setting signal P52 is information that is input to the oscillator 255 and specifies a frequency of the reception LO signal G222, and is generated by the control unit 203 on the basis of reception frequency information previously allocated to the base station 20 to determine a reception frequency.

The demodulator 252b converts the frequency conversion signal G223 to at least one of an encoded reception digital voice signal or an encoded reception digital data signal on the basis of a demodulation method specifying signal P53 and outputs the resulting signal to the demodulator 252a as a demodulation signal G224.

The demodulation method specifying signal P53 is information for specifying a component (HW) and an algorithm (SW) used for demodulation processing. The control unit 203 generates the demodulation method specifying signal P53 on the basis of registration information previously recorded on the control unit 203, request information transmitted from a communication partner, and determination information determined by the control unit 203 on the basis of monitoring information (electric field intensity, error rate) of a reception signal.

When a component (HW) or an algorithm (SW) used for demodulation processing is specified by the demodulation method specifying signal P53, it is possible to select demodulation processing appropriate for a communication partner, demodulation processing optimum for a type of data to be obtained as a reception signal and quality to be needed for a reception signal, and demodulation processing suitable for a radio wave propagation situation estimated from monitoring information of a reception signal and improve communication quality.

The decoder 252a decodes the demodulation signal G224 on the basis of a decoding method specifying signal P54 and outputs the decoded signal to the control unit 203 as a decode signal G225.

The decoding method specifying signal P54 is information for specifying a component (HW) and an algorithm (SW) used for decoding processing. The control unit 203 generates the decoding method specifying signal P54 on the basis of registration information previously recorded on the control unit 203, request information transmitted from a communication partner, and determination information determined by the control unit 203 on the basis of monitoring information (electric field intensity, error rate) of a reception signal.

When a component (HW) or an algorithm (SW) used for decoding processing is specified by the decoding method specifying signal P54, it is possible to select decoding processing appropriate for a communication partner, decoding processing optimum for a type of data to be obtained as a reception signal and quality to be needed for a reception signal, and decoding processing suitable for a radio wave propagation situation estimated from monitoring information of a reception signal and improve communication quality.

The control unit 203 outputs the decode signal G225 to an external network. As the external network, a LAN or a public communication network is cited, and as a transmission destination of the reception information, the instruction terminal device 10 and a line control device is cited.

The demodulator 252b includes a channel selection means (FREQ SEL) (not illustrated). The channel selection means includes a function that can receive narrowband frequency channel specifying information (NB_FCH specifying information) from the control unit 203 and extract a component of a frequency and a band on the basis of contents of the narrowband frequency channel specifying information in the frequency conversion signal G223 when the narrowband frequency channel specifying information has been input. The channel selection means can also be included in the oscillator 255. When the channel selection means is included in the oscillator 255, an extraction function can be realized by frequency selection.

(3) Instruction Terminal Device

Figure 5:
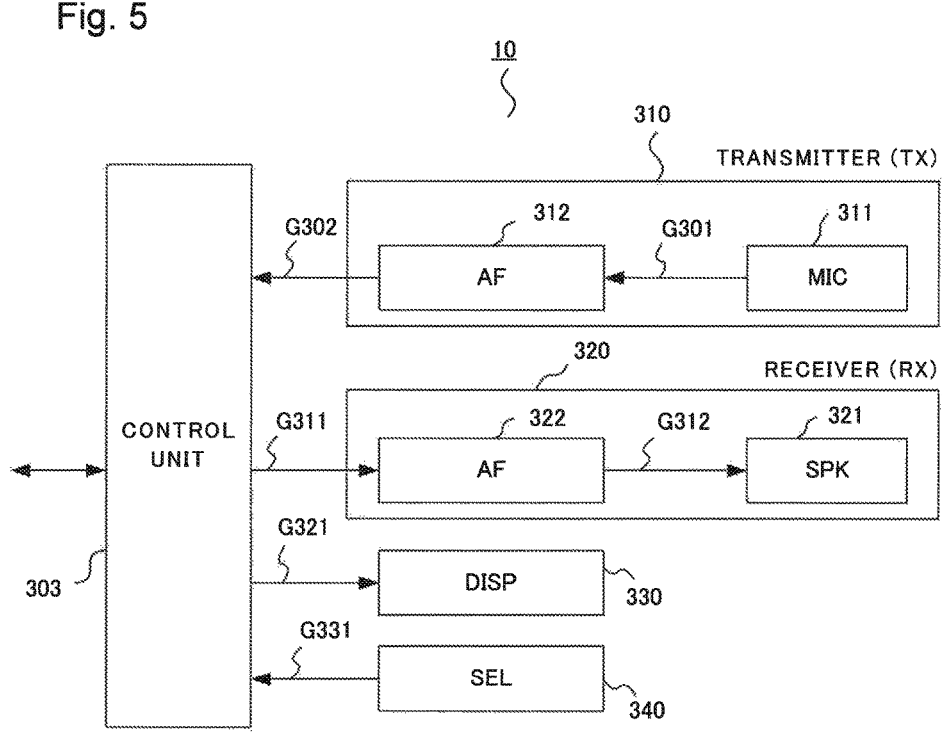
FIG. 5 is a block diagram of an instruction terminal device.

Next, the instruction terminal device 10 will be described. FIG. 5 is a block diagram of the instruction terminal device 10.

The instruction terminal device 10 of the present invention includes a control unit 303, a transmitter (TX) 310, a receiver (RX) 320, a display unit (DISP) 330, and a channel selection unit (SEL) 340, and communicates with the mobile station 30 via the base station 20. The transmitter 310 includes a voice input unit (MIC) 311 and a transmission signal processing unit (AF) 312. Further, the receiver 320 includes a voice output unit (SPK) 321 and a reception signal processing unit (AF) 322.

(3-1) Configuration of Transmitter

The voice input unit 311 of the transmitter 310 outputs a voice to the transmission voice processing unit 312 as a transmission voice signal G301 that is an analog signal.

The transmission voice processing unit 312 converts the transmission voice signal G301 to a digital signal and outputs the digital signal to the control unit 303 as a transmission digital voice signal G302.

The control unit 303 outputs the transmission digital voice signal G302 to an external network. As the external network, a LAN or a public communication network can be exemplified, and as a transmission destination of the transmission information, the base station 20 and a line control device can be exemplified.

(3-2) Configuration of Receiver

The control unit 303 input at least one of a reception digital voice signal or a reception digital data signal from an external network, outputs a reception digital voice signal G311 to the reception signal processing unit 322, and outputs a reception digital data signal G321 to the display unit 330.

As an example of the external network, a LAN or a public communication network is cited, and as a transmission source of the input information, the base station 20 and a line control device is cited.

The reception signal processing unit 322 converts the reception digital voice signal G311 that is a digital signal to a reception voice signal G312 that is an analog signal and outputs the converted signal to the voice output unit 321.

The voice output unit 321 converts the reception voice signal G312 to a reception voice and outputs the voice. Further, the display unit 330 converts the reception digital data signal G321 to an image or a voice and outputs the image or the voice.

The channel selection unit 340 generates narrowband frequency channel specifying information (NB_FCH specifying information) G331 and outputs the generated information to the control unit 303.

Figure 8:
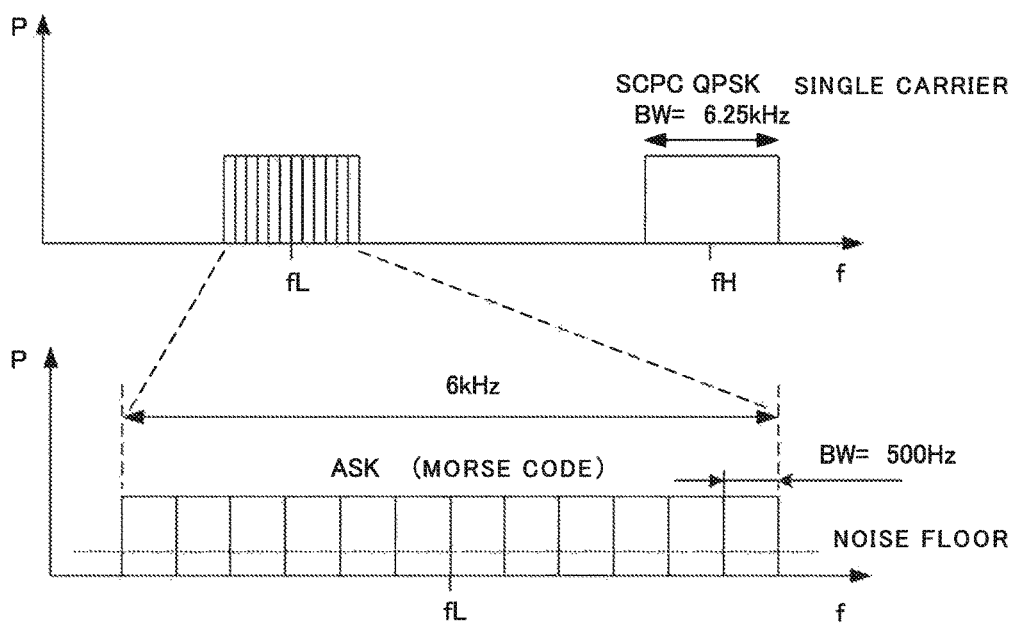
FIG. 8 is a diagram exemplifying a narrowband frequency channel.

The channel selection unit 340 generates the narrowband frequency channel specifying information G331 on the basis of a narrowband frequency channel selection instruction of an instructor (operator). The narrowband frequency channel is a channel having a narrow frequency band as exemplified in FIG. 8. In FIG. 8, a case in which there are a plurality of channels having, for example, a band of 500 Hz is cited. Each narrowband frequency channel is assigned with an identification code (number). The narrowband frequency channel specifying information G331 includes the identification code.

The narrowband frequency channel specifying information G331 is output to the control unit 203 of the base station 20 through an external network from the control unit 303 and is converted to narrowband frequency channel specifying information inside the base station. Further, via the base station 20, the information is also output to the control unit 103 of the mobile station 30 and converted to narrowband frequency channel specifying information inside the mobile station.

(4) Operations of the Entire System

Next, the operations of the above-described mobile wireless communication system 2A will be described using the configuration of FIG. 1 as an example. In FIG. 1, there are an instruction terminal device 10, a base station 20, and a plurality of mobile stations 30 (here, a mobile station 30a and a mobile station 30b). Each mobile station 30 generates an uplink signal that is a wireless signal on the basis of information intended to be transmitted by an operator who is a transmitter and transmits the generated signal to the base station 20 via wireless communication.

Contents of the uplink signal include voice information, image information, other data information, and control information on communication. These pieces of information can be roughly classified according to necessities of immediacy for the respective pieces of information. The immediacy indicates that a receiver can receive information substantially at the same time as transmission of information by a transmitter, as represented, for example, by a telephone call.

The base station 20 converts the uplink signal that is a wireless signal received from the mobile station 30 to a wired signal or a wireless signal of another format and transmits the converted signal to the instruction terminal device 10.

The instruction terminal device 10 received the uplink signal from the base station 20 and executes, for an operator as a receiver, processing (e.g. reproduction or recording) for contents (voice information, image information, and other data information) included in the signal.

Inversely, the instruction terminal device 10 generates a downlink signal that is a wired signal or a wireless signal of a format different from that used between the base station 20 and the mobile station 30 on the basis of information intended to be transmitted by an operator as a transmitter and transmits the generated signal to the base station 20.

Contents of the downlink signal also include voice information, image information, other data information, and control information on communication, and these pieces of information can be also roughly classified according to necessities of immediacy for the respective pieces of information as in the case of the uplink signal.

The base station 20 receives the downlink signal from the instruction terminal device 10, converts the received signal to a downlink signal that is a wireless signal, and transmits the converted signal to a plurality of mobile stations 30 via wireless communication.

Each mobile station 30 receives the downlink signal from the base station 20 and executes, for an operator as a receiver, processing (e.g. reproduction or recording) for contents (voice information, image information, and other data information) included in the signal.

An uplink signal that is a wireless signal generated by a certain mobile station 30 (e.g. the mobile station 30a) is also received by another mobile station 30 (e.g. the mobile station 30*b*) as a direct wave communication between the mobile stations 30.

The mobile station 30 having received the signal executes, for an operator as a receiver, processing (e.g. reproduction or recording) for contents (voice information, image information, and other data information) included in the signal.

Next, with reference to FIG. 8, a frequency map in wireless communication performed between the base station 20 and the mobile station 30 will be described using an SCPC system for frequency division duplex as an example.

In the SCPC system for frequency division duplex in which a frequency band is separated in uplink/downlink communications, as illustrated in FIG. 8, on downlink communication from the base station 20 to the mobile station 30, a band (here, as an example, a band width is assumed to be 6.25 kHz) previously set at a frequency fH as a center is assumed as one channel. Further, on uplink communication from the mobile station 30 to the base station 20 in a normal situation, a band having center frequency fL different from fH and the same band-width as the downlink signal is assumed as one channel. These are used as a pair (1:1). Such a (1:1) relation in which numbers of channels in uplink/downlink communications are the same will be expressed as a number-of-channels equal state.

In FIG. 8, a band of 6.25 kHz bandwidth in which the frequency fL is centered in uplink communication is further divided into a plurality of narrowbands (here, as an example, a case of a band width of 500 Hz is indicated), and numbers of uplink and downlink channels are assumed to be 1:N (N is an integer equal to or larger than 2). Such a (1:N) relation in which numbers of channels in uplink/downlink communications are not the same will be expressed as a number-of-channels unequal state. Such an operation can be performed when, for example, many uplink communication channels are necessary in a disaster occurrence situation.

In the present exemplary embodiment, the encoder 242*a* or the decoder 252*a* of the base station 20 monitors communication, the monitoring result is transmitted to the control unit 203, and the control unit 203 determines switching (number-of-channels switching) between a number-of-channels equal state and a number-of-channels unequal state and a ratio in an unequal number state. As a monitoring result that the determination is based on, a degree of congestion of communication, a degree of necessity of immediacy in a plurality of uplink communications, or the like can be exemplified.

Further, in the present exemplary embodiment, the demodulator 252*b* or the decoder 252*a* of the base station 20 monitors a number-of-channels equal/unequal state and a ratio in a number-of-channels unequal state in the frequency conversion signal G223 or the demodulation signal G224 by measuring an energy distribution in a frequency spectrum, and the monitoring results are transmitted to the control unit 203, whereby the control unit 203 can recognize a switching situation between a number-of-channels equal state and a number-of-channels unequal state and a ratio in a number-of-channels unequal state having already become operative in an uplink communication channel. As a result, it is possible to automatically control number-of-channels switching in accordance with a situation of the uplink communication channel.

An operator of the base station 20 may determine number-of-channels switching. The operator can recognize communication congestion by monitoring a usage situation (a ratio of time being used for communication) for each channel. Further, immediacy can be recognized by monitoring usage applications (voice communication, data communication, and the like).

Further, the number-of-channels switching may be determined by receiving, by the control unit 203 of the base station 20, based on switching request information received from a line control device (not illustrated) or the instruction terminal device 10.

The base station 20 makes, on the basis of the number-of-channels switching determination, a request to the mobile station 30 for switching for causing the mobile station 30 to communicate in a number-of-channels equal r state of (1:1) in a normal situation and to communicate in a number-of-channels unequal state of (1:N) in an emergency situation such as a disaster occurrence situation. The switching request information is transmitted by being included in a control signal generally transmitted/received between the base station 20 and the mobile station 30. The mobile station 30 having received the control signal switches an operation setting (number-of-channels setting) of a transmitter in the own station.

Further, the base station 20 switches, on the basis of a determination result of switching necessity, an operation setting of a receiver of the own station at the time of uplink signal reception from the mobile station 30.

The switching request information may be generated by the instruction terminal device 10 or another device other than the base station 20. It is possible for the base station 20 to convert the information to a control signal and transmit the control signal to the mobile station 30.

In a number-of-channels unequal state, the band for one uplink channel is narrow (here, a band width is assumed to be 500 Hz), and therefore a symbol rate of a signal transmittable in the band decreases correspondingly to the band-width. On the other hand, it is possible to accommodate, in the band, a signal of Amplified Shift Keying (ASK) modulation for intermittently continuing a carrier using e.g. Morse Code.

At the time of reception, at least a power of reception band noise proportional to a reception signal bandwidth is superposed with a reception signal power. When the reception signal band is narrow, a reception band noise power (a product of a level of a noise floor of thermal noise and a reception signal bandwidth) is reduced. In other words, to obtain the same carrier-power to noise-power ratio (C/N), when the signal bandwidth decreases from 6.25 kHz to 500 Hz, an influence of reception band noise does not change even upon transmission power reduction to approximately $\frac{1}{12}$.

As a result, advantageous effects in which consumed power can be reduced, further a battery lasts long, and size reduction and cost reduction are achieved for heat release since heat generation decreases are obtained.

(4-2) Operation of Mobile Station

Next, an operation of the mobile station 30 will be described with reference to FIG. 2.

(4-2-1) Operation of Transmitter

A voice of an operator of a mobile station is converted to a voice signal by the voice input unit 141*a*, and a transmission digital voice signal G11 is generated.

The encoder 142*a* encodes the transmission digital voice signal G11 in accordance with a coding method such as an Adaptive Differential Pulse Code Modulation (ADPCM) method, a Code-Excited Linear Prediction (CELP) method, a voice CODEC, and the like specified by a coding method specifying signal P11 from the control unit 103 and outputs the encoded signal to the modulator 142b as an encode voice signal G12.

On the other hand, the input unit 144 is, for example, a keyboard for outputting digital encode data or a switch for outputting ON/OFF states. The input unit 144 generates a transmission digital data signal G13 on the basis of an operation of an operator, and then the encoder 142a outputs the generated signal to the modulator 142b as an encode data signal G14.

The modulator 142b modulates the encode voice signal G12 and the encode data signal G14 and outputs the modulated signal to the frequency converter 143a as a modulation signal G15.

The frequency converter 143a mixes the modulation signal G15 and a transmission LO signal G16 and generates a transmission RF signal G17.

The high-frequency FE unit 143b performs undesired wave elimination from the transmission RF signal G17 and power amplification and outputs the resulting signal to the duplexer 107.

The duplexer 107 performs demultiplexing on the basis of frequencies to share one antenna 108 by signals of different frequency bands.

The antenna 108 converts the input transmission RF signal G17 to a radio wave propagating in a space and radiates the radio wave toward the base station 20 and another mobile station 30.

At least one of the modulator 142b or the oscillator 143c can receive, from the control unit 103, transmission narrowband frequency channel specifying information (TX_NB_FCH specifying information) for specifying a part of a plurality of set transmission narrowband frequency channels. Then, the modulator 142b outputs a modulation signal of a frequency based on contents thereof and the oscillator 143c outputs an oscillation signal of a frequency based on the contents.

The TX_NB_FCH specifying information is generated on the basis of information on what transmission narrowband frequency channel is used, obtained from, for example, an operation of an operator, an information input operation (as an output of the channel selection unit 340) in the instruction terminal device 10, or determination processing of the control unit 103.

(4-2-2) Operation of First Receiver

The antenna 108 acquires a DL reception RF signal G21 (base station wave reception high-frequency signal) from the base station 20 and outputs the acquired signal to the duplexer 107. The duplexer 107 guides the DL reception RF signal G21 to the first high-frequency FE unit 153c of the first high-frequency signal processing unit 153.

The first high-frequency FE unit 153c eliminates undesired waves from the DL reception RF signal G21, also performs amplification to the signal up to a level necessary for demodulation, and outputs the amplified signal. The first oscillator 155 generates a DL reception LO signal G22 (base station wave reception local oscillation signal) to be a carrier for demodulation or frequency conversion.

The first frequency converter 153b performs frequency conversion by analog mixing operation for the DL reception RF signal G21 and the DL reception LO signal G22 and generates a DL reception ABB signal (base station wave reception analog BB signal) or a DL reception IF signal (base station wave reception intermediate-frequency signal). These signals each are output as a frequency conversion signal G23.

The first demodulator 152b demodulates the frequency conversion signal G23 and outputs the demodulated signal as a demodulation signal G24. The first decoder 152a decodes the demodulation signal G24 and generates a (decoded) base station wave reception digital voice signal and a (decoded) base station wave reception digital data signal and outputs the generated signals as decode signals G25, respectively.

The first voice signal processing unit 151 performs D/A conversion for the decode signal G25 corresponding to the base station wave reception digital voice signal and generates a base station wave reception analog voice signal.

The first voice output unit 151a receives the base station wave reception analog voice signal, converts the signal to a voice that is a sound wave, and outputs the voice to an operator from, for example, a speaker or an earphone.

Further, the first display 154 coverts the decode signal G25 corresponding to the base station wave reception digital data signal to base station wave narrowband frequency channel information and displays the information to the operator. The base station wave narrowband frequency channel information may be displayed on the first display 154 as an image or output using voices, vibrations, or the like.

The first channel selection unit 153a extracts components of a specified frequency and band in the frequency conversion signal G23 on the basis of base station wave reception narrowband frequency channel specifying information (DL_RX NB_FCH specifying information) from the control unit 103.

When included in the first demodulator 152b, the first channel selection unit 153a extracts components of a specified frequency and band as a part of the function of the first demodulator 152b. Further, when included in the first oscillator 155, the first channel selection unit 153a extracts components of a specified frequency and band by frequency selection.

The control unit 103 receives information on what base station wave reception narrowband frequency channel is used, obtained from, for example, an operation of the operator, an operation (as an output of the channel selection unit 340) of the instruction terminal device 10, or determination processing of the control unit. On the basis of the information, the control unit 103 generates DL_RX NB_FCH specifying information.

(4-2-3) Operation of Second Receiver

The antenna 108 acquires a UL reception RF signal G31 (direct wave reception high-frequency signal) from another mobile station 30 and outputs the signal to the duplexer 107. The duplexer 107 guides the UL reception RF signal G31 to the second high-frequency FE unit 163c of the second high-frequency signal processing unit 163.

The second high-frequency FE unit 163c eliminates undesired waves from the UL reception RF signal G31, also performs amplification to the signal up to a level necessary for demodulation, and outputs the amplified signal.

The second oscillator 165 generates a UL reception LO signal G32 (direct wave reception local oscillation signal) to be a carrier for demodulation or frequency conversion.

The second frequency converter 163b performs frequency conversion by analog mixing operation for the UL reception RF signal G31 and the UL reception LO signal G32 and generates a UL reception ABB signal (direct wave reception analog BB signal) or a UL reception IF signal (direct wave reception intermediate-frequency signal). These signals are output as frequency conversion signals G33, respectively.

The second demodulator 162b demodulates the frequency conversion signal G33 and outputs the demodulated signal as a demodulation signal G34. The second decoder 162a decodes the demodulation signal G34 and generates a (decoded) direct wave reception digital voice signal and a (decoded) direct wave reception digital data signal and outputs the generated signals as decode signals G35, respectively.

The second voice signal processing unit 161 performs D/A conversion for the decode signal G35 corresponding to the direct wave reception analog voice signal and generates a direct wave reception analog voice signal.

The second voice output unit 161a receives the direct wave reception analog voice signal, converts the signal to a voice that is a sound wave, and outputs the voice to an operator from, for example, a speaker or an earphone.

Further, the second display 164 coverts the decode signal G35 corresponding to the direct wave reception digital data signal to direct wave narrowband frequency channel information and displays the information to the operator. The direct wave narrowband frequency channel information may be displayed on the second display 164 as an image or output using voices, vibrations, or the like.

The second channel selection unit 163a extracts components of a specified frequency and band in the frequency conversion signal G33 on the basis of direct wave reception narrowband frequency channel specifying information (UL_RX NB_FCH specifying information) from the control unit 103.

When included in the second demodulator 162b, the second channel selection unit 163a extracts components of a specified frequency and band as a part of the function of the second demodulator 162b. Further, when included in the second oscillator 165, the second channel selection unit 163a extracts components of a specified frequency and band by frequency selection.

The control unit 103 receives information on what direct wave reception narrowband frequency channel is used, obtained from, for example, an operation of an operator, an operation (as an output of the channel selection unit 340) of the instruction terminal device 10, or determination processing of the control unit. On the basis of the information, the control unit 103 generates UL_RX NB_FCH specifying information.

(4-3) Operation of Base Station

Next, in FIG. 4, an operation of the base station 20 of the present exemplary embodiment will be described in detail.

Here, a case in which the base station 20 of the present exemplary embodiment includes a control unit 203, a transmitter 204, a receiver 205, a duplexer 207, and an antenna 208 is used as an example.

(4-3-1) Operation of Transmitter

The encoder 242a receives an input signal G211 of a transmission digital voice signal and a transmission digital data signal input via the control unit 203, followed by encoding, and outputs the encoded signal to the modulator 242b as an encode signal G212. The transmission digital voice signal is encoded in accordance with a coding method such as an ADPCM method, a CELP method, a voice CODEC, and the like specified by a coding method specifying signal P41 from the control unit 203.

The modulator 242b modulates the encode signal G212 and outputs the modulated signal as a modulation signal G213. The oscillator 243c generates a transmission LO signal G214 for determining a frequency of a carrier as a wireless signal.

The frequency converter 243a performs frequency conversion by analog mixing operation for the modulation signal G213 and the transmission LO signal G214 and outputs the resulting signal as a transmission RF signal G215.

The high-frequency FE unit 243b eliminates undesired waves from the transmission RF signal G215, also performs amplification to the signal up to a power necessary for transmission, and outputs the resulting signal to the duplexer 207.

The duplexer 207 performs demultiplexing on the basis of frequencies to share one antenna 208 by signals of different frequency bands.

The antenna 208 converts the input transmission RF signal G215 to a radio wave propagating in a space and radiates the radio wave toward the mobile station 30.

(4-3-2) Operation of Receiver

The antenna 208 acquires a reception RF signal G221 (reception high-frequency signal) from the mobile station 30 and outputs the acquired signal to the duplexer 207. The duplexer 207 guides the reception RF signal G221 to the high-frequency FE unit 253c of the high-frequency signal processing unit 253.

The high-frequency FE unit 253c eliminates undesired waves from the reception RF signal G221, also performs amplification to the signal up to a level necessary for demodulation, and outputs the amplified signal. The oscillator 255 generates a reception LO signal G222 to be a carrier for demodulation or frequency conversion.

The frequency converter 253b performs frequency conversion by analog mixing operation for the reception RF signal G221 and the reception LO signal G222 and outputs the resulting signal as a frequency conversion signal G223.

The demodulator 252b demodulates the frequency conversion signal G223 and outputs the demodulated signal as a demodulation signal G224. The decoder 252a decodes the demodulation signal G224 and outputs the decoded signal to the control unit 203 as a decode signal G225.

The control unit 203 outputs the decode signal G225 to an external network. As the external network, a LAN or a public communication network is cited, and as a transmission destination of reception information, the instruction terminal device 10 and a line control device is cited.

At least one of the demodulator 252b or the oscillator 255 includes a channel selection function (not illustrated). The channel selection function extracts components of a specified frequency and band in the frequency conversion signal G223 on the basis of narrowband frequency channel specifying information (NB_FCH specifying information) from the control unit 203. When included in the demodulator 252b, the channel selection function extracts components of a specified frequency and band as a part of the function of the demodulator 252b. Further, when included in the oscillator 255, the channel selection function extracts components of a specified frequency and band by frequency selection.

The control unit 203 receives information on what narrowband frequency channel is used, obtained from, for example, a request signal from the mobile station, determination processing of the control unit, or the channel selection unit 340 of the instruction terminal device 10 through the control unit. On the basis of the information, the control unit 203 generates NB_FCH specifying information.

(4-4) Operation of Instruction Terminal Device

Next, in FIG. 5, an operation of the instruction terminal device 10 of the present exemplary embodiment will be described in detail.

(4-4-1) Operation of Transmitter

A voice that is a sound wave is converted to an analog voice signal by the voice input unit 311 and output as a transmission voice signal G301.

The transmission signal processing unit 312 performs A/D conversion for the transmission voice signal G301 and outputs the converted signal to the control unit 303 as a transmission digital voice signal G302. The control unit 303 outputs the transmission digital voice signal G302 to an external network. As the external network, a LAN or a public communication network is cited, and as a transmission destination of transmission information, the base station 20 and a line control device is cited.

(4-4-2) Operation of Receiver

The control unit 303 receives at least one of a reception digital voice signal or a reception digital data signal from an external network. The control unit 303 outputs a reception digital voice signal G311 to the reception signal processing unit 322, and outputs a reception digital data signal G321 to the display unit 330. As the external network, a LAN or a public communication network is cited, and as a transmission source of input information, the base station 20 and a line control device is cited.

The reception signal processing unit 322 performs D/A conversion for the reception digital voice signal G311 and outputs the converted signal as a reception voice signal G312. The voice output unit 321 converts the reception voice signal G312 to a voice that is a sound wave and outputs the voice to an operator using a speaker, an earphone, or the like.

As described above, a plurality of mobile stations can perform uplink communication at the same time, and therefore even when a mobile station is about to start performing uplink communication and also another mobile station is using a band thereof, it is unnecessary to wait until the band becomes unused, resulting in an improvement in response immediacy.

Further, since different communication bandwidths are assigned to uplink communication and downlink communication, it is unnecessary for a mobile station to transmit, via uplink communication, the same power as a power transmitted by a base station via downlink communication, and therefore a consumed power necessary for transmission in uplink communication can be reduced. As a result, it is possible to achieve size reduction, endurance against wide environment temperature conditions, adaptations to severe heat radiation requirements, and long-term drive using a battery.

Further, a code (e.g. Morse Code) recongnizable by human with a sense of hearing, vision, and touch is introduced, and therefore it is possible for human to directly recognize encoded information using the five senses. Further, a transmission function featuring small consumed power and small heat generation became able to be introduced, and therefore it is possible to mount an uplink communication transmission function while maintaining an advantage as a command receiver.

Second Exemplary Embodiment

A second exemplary embodiment of the present invention will be described. For the same components as in the first exemplary embodiment, the same reference signs are used, and description thereof will be omitted, as appropriate. In the first exemplary embodiment, a case in which the base station 20 performs transmission/reception via one frequency channel has been described. In contrast, in the present exemplary embodiment, it is possible for the base station 20 to perform transmission/reception via two or more frequency channels.

Figure 6:
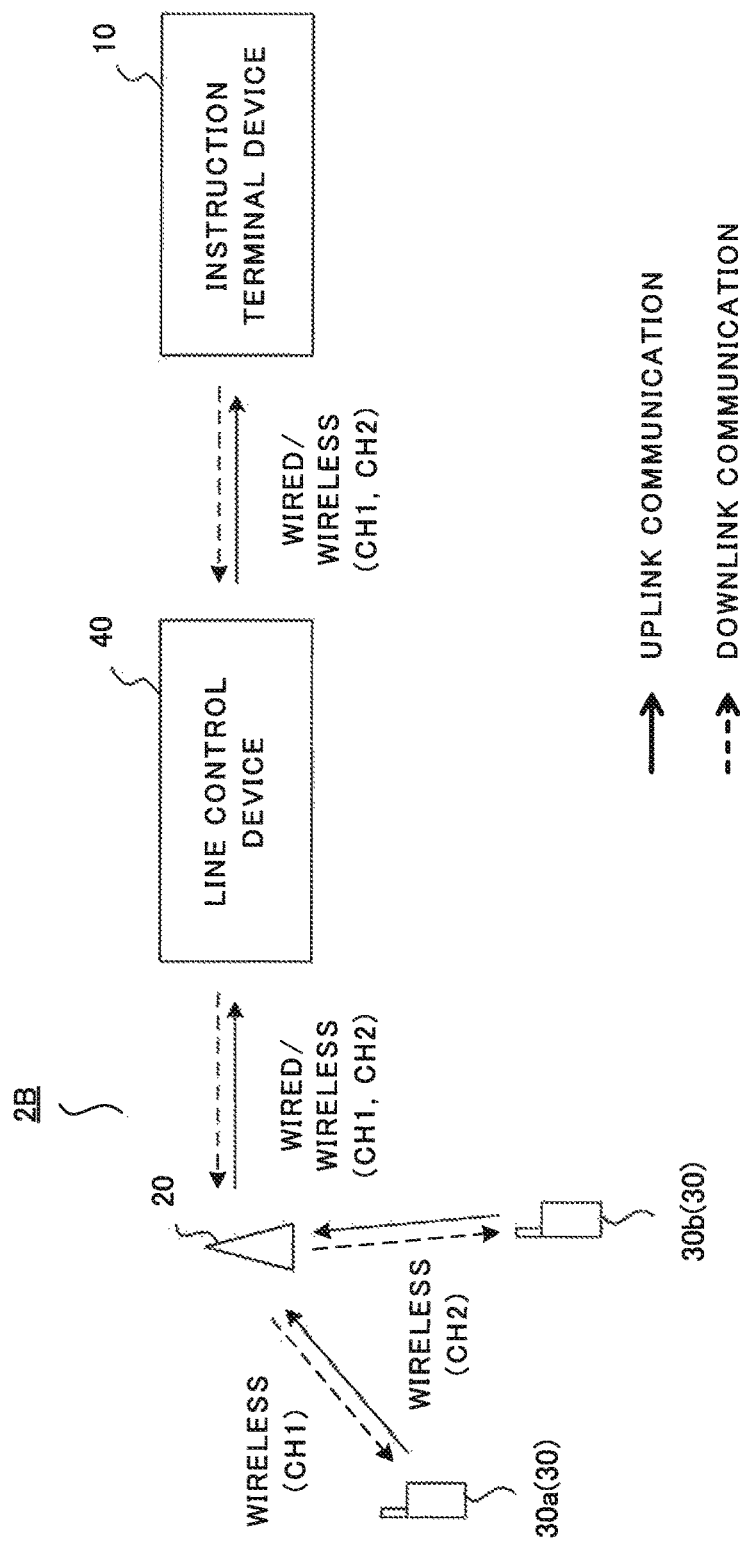
FIG. 6 is a block diagram of a mobile wireless communication system according to a second exemplary embodiment.

FIG. 6 is a block diagram of such a mobile wireless communication system 2B. A line control device 40 is additionally provided between the instruction terminal device 10 and the base station 20, compared with the mobile wireless communication system 2A illustrated in FIG. 1.

The line control device 40 connects, on the basis of specifying information for specifying a specific mobile station 30 from the instruction terminal device 10, the instruction terminal device 10 to a frequency channel used by the specified mobile station 30.

Figure 7:
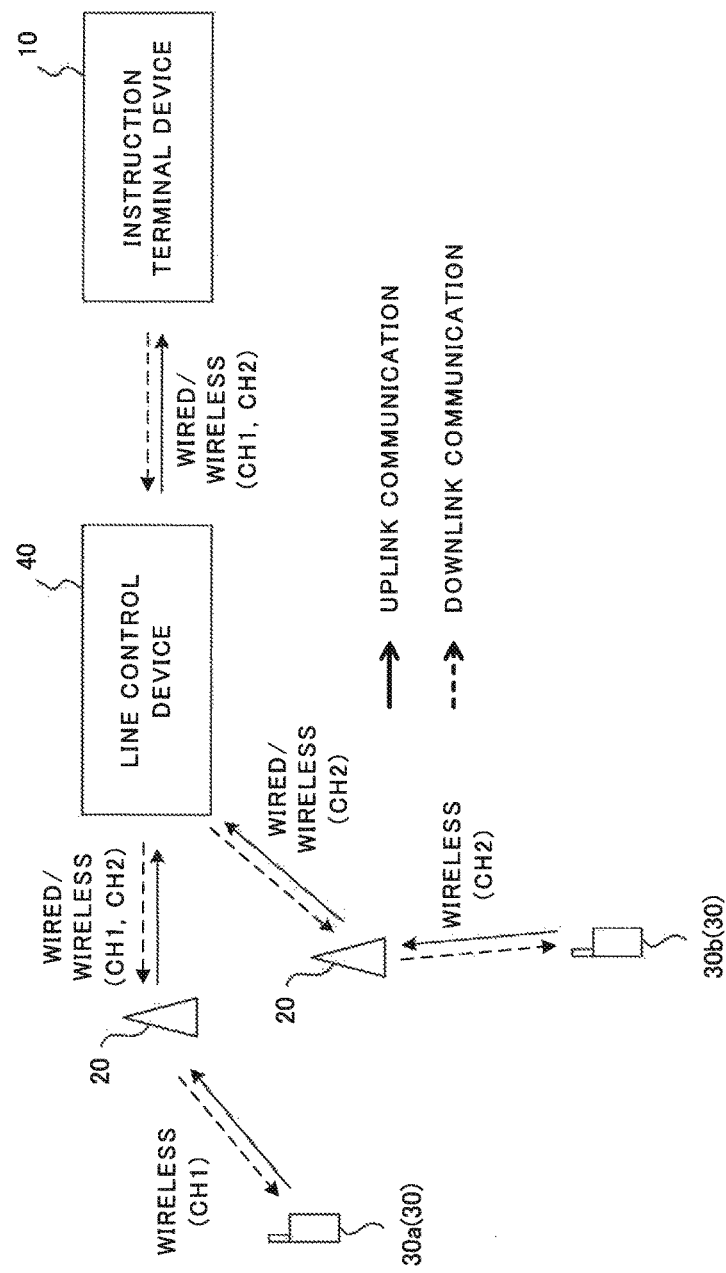
FIG. 7 is a block diagram of a mobile wireless communication system in which there are two or more base stations.

Further, FIG. 7 is a block diagram of a mobile wireless communication system 2C in which there are two or more base stations 20. In the mobile wireless communication system 2C, one or more mobile stations 30 exist for each base station 20 and are transmittable to/receivable from each base station 20.

Therefore, the line control device 40 is additionally provided between the instruction terminal device 10 and the base station 20. The line control device 40 connects, on the basis of specifying information for a specific mobile station 30 from the instruction terminal device 10, the instruction terminal device 10 to a base station 20 transmittable/receivable by the specified mobile station 30.

Thereby, using two or more frequency channels, transmission/reception in accordance with a communication state can be performed.

While the present invention has been described with reference to exemplary embodiments (and examples) thereof, the present invention is not limited to these exemplary embodiments (and examples). The constitution and details of the present invention can be subjected to various modifications which can be understood by those skilled in the art, without departing from the scope of the present invention.

This application is based upon and claims the benefit of priority from Japanese patent application No. 2014-152993, filed on Jul. 28, 2014, the disclosure of which is incorporated herein in its entirety by reference.

REFERENCE SIGNS LIST 2A to 2C Mobile wireless communication system
10 Instruction terminal device
20 Base station
30 (30a, 30b) Mobile station
40 Line control device
103 Control unit
104 Transmitter
105 First receiver
106 Second receiver
107 Duplexer
108 Antenna
141 Voice signal processing unit (TX-AF)
141a Voice input unit (MIC)
142 BB signal processing unit (TX-BB)
142a Encoding unit (ENC)
142b Modulator (MOD)
143 High-frequency signal processing unit (TX-RF)
143a Frequency converter (MIX)
143b High-frequency FE unit (FE)
143c Oscillator (LO)
144 Input unit (KEY)
151 First voice signal processing unit (RX-AF)
151a First voice output unit (SPK)

152 First BB signal processing unit (RX-BB)
152a First decoder (DEC)
152b First demodulator (DEM)
153 First high-frequency signal processing unit (RX-RF)
153a First channel selection unit (SEL)
153b First frequency converter (MIX)
153c First high-frequency FE unit (FE)
154 First display (DISP)
155 First oscillator (LO)
161 Second voice signal processing unit (RX-AF)
161a Second voice output unit (SPK)
162 Second BB signal processing unit (RX-BB)
162a Second decoder (DEC)
162b Second demodulator (DEM)
163 Second high-frequency signal processing unit (RX-RF)
163a Second channel selection unit (SEL)
163b Second frequency converter (MIX)
163c Second high-frequency FE unit (FE)
164 Second display (DISP)
165 Second oscillator (LO)
203 Control unit
204 Transmitter (TX)
205 Receiver (TX)
207 Duplexer (DUP)
208 Antenna
242 BB signal processing unit (TX-BB)
242a Encoding unit (ENC)
242b Modulator (MOD)
243 High-frequency signal processing unit (TX-RF)
243a Frequency converter (MIX)
243b High-frequency FE unit (FE)
243c Oscillator (LO)
252 BB signal processing unit (RX-BB)
252a Decoder (DEC)
252b Demodulator (DEM)
253 High-frequency signal processing unit (RX-RF)
253b Frequency converter (MIX)
253c High-frequency FE unit (FE)
255 Oscillator (LO)
303 Control unit
310 Transmitter (TX)
311 Voice input unit (MIC)
312 Transmission signal processing unit (AF)
320 Receiver (RX)
321 Voice output unit (SPK)
322 Reception signal processing unit (AF)
330 Display unit (DISP)
340 Channel selection unit (SEL)

The invention claimed is:

1. A mobile communication system comprising a base station and a plurality of mobile stations that communicate with the base station, wherein
at least one of the base station and the plurality of mobile stations includes a number-of-channels switching unit that switches, on the basis of a communication state, a ratio of numbers of channels for downlink communication and uplink communication, by dividing a bandwidth of a channel.

2. The mobile communication system according to claim 1, wherein
the number-of-channels switching unit switches the ratio of numbers of channels to a state of 1:1 and a state of 1:N (where N is a positive integer equal to or larger than 2).

3. The mobile communication system according to claim 1, wherein
the base station transmits a control signal for making an instruction for setting the ratio of numbers of channels for downlink communication and uplink communication to a specific mobile station of the plurality of mobile stations.

4. The mobile communication system according to claim 3, wherein
the specific mobile station sets a transmission narrowband frequency channel for transmission for a transmitter on the basis of the control signal.

5. The mobile communication system according to claim 3, wherein
the base station sets a reception narrowband frequency channel for reception for a receiver on the basis of the control signal.

6. The mobile communication system according to claim 4, wherein
the transmission narrowband frequency channel is subjected to ASK modulation.

7. The mobile communication system according to claim 5, wherein
the reception narrowband frequency channel is subjected to ASK modulation.

8. The mobile communication system according to claim 1, wherein
the number-of-channels switching unit monitors the communication state and, with reference to the communication state, sets at least one of a frequency channel, a bandwidth, a modulation processing, a demodulation processing, an encoding processing, a decoding processing, and a transmission power.

9. A base station of a mobile communication system comprising the base station and a plurality of mobile stations that communicate with the base station, wherein
the base station includes a number-of-channels switching unit that switches, on the basis of a communication state, a ratio of numbers of channels for downlink communication and uplink communication, by dividing a bandwidth of a channel.

10. The base station according to claim 9, wherein
the number-of-channels switching unit switches the ratio of numbers of channels to a state of 1:1 and a state of 1:N (where N is a positive integer equal to or larger than 2).

11. The base station according to claim 9, wherein
the base station transmits a control signal for making an instruction for setting the ratio of numbers of channels for downlink communication and uplink communication to a specific mobile station of the plurality of mobile stations.

12. The base station according to claim 11, wherein
the base station sets a reception narrowband frequency channel for reception for a receiver on the basis of the control signal.

13. The base station according to claim 12, wherein
the reception narrowband frequency channel is subjected to ASK modulation.

14. The base station according to claim 9, wherein
the number-of-channels switching unit monitors the communication state and, with reference to the communication state, sets at least one of a frequency channel, a bandwidth, a modulation processing, a demodulation processing, an encoding processing, a decoding processing, and a transmission power.

15. A mobile station of a mobile communication system comprising a base station and a plurality of mobile stations that communicate with the base station, wherein the mobile station includes a number-of-channels switching unit that switches, on the basis of a communication state, a ratio of numbers of channels for downlink communication and uplink communication, by dividing a bandwidth of a channel.

16. The mobile station according to claim 15, wherein the number-of-channels switching unit switches the ratio of numbers of channels to a state of 1:1 and a state of 1:N (where N is a positive integer equal to or larger than 2).

17. The mobile station according to claim 15, wherein the base station transmits a control signal for making an instruction for setting the ratio of numbers of channels for downlink communication and uplink communication to the mobile station.

18. The mobile station according to claim 17, wherein the mobile station sets a transmission narrowband frequency channel for transmission for a transmitter on the basis of the control signal.

19. The mobile station according to claim 18, wherein the transmission narrowband frequency channel is subjected to ASK modulation.

20. The mobile station according to claim 15, wherein the number-of-channels switching unit monitors the communication state and, with reference to the communication state, sets at least one of a frequency channel, a bandwidth, a modulation processing, a demodulation processing, an encoding processing, a decoding processing, and a transmission power.

* * * * *